(12) United States Patent
Horiguchi

(10) Patent No.: US 9,197,776 B2
(45) Date of Patent: Nov. 24, 2015

(54) IMAGE READING DEVICE AND IMAGE FORMING APPARATUS

(71) Applicant: KYOCERA Document Solutions Inc., Osaka (JP)

(72) Inventor: Yasuyuki Horiguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/553,137

(22) Filed: Nov. 25, 2014

(65) Prior Publication Data
US 2015/0156360 A1 Jun. 4, 2015

(30) Foreign Application Priority Data

Nov. 29, 2013 (JP) .................................. 2013-248685

(51) Int. Cl.
*H04N 1/04* (2006.01)
*H04N 1/00* (2006.01)
(52) U.S. Cl.
CPC ....... *H04N 1/00822* (2013.01); *H04N 1/00525* (2013.01); *H04N 1/00599* (2013.01)
(58) Field of Classification Search
CPC .......... H04N 1/00822; H04N 1/00525; H04N 1/00599

USPC .................................. 358/498, 497, 474, 495
See application file for complete search history.

(56) References Cited

U.S. PATENT DOCUMENTS

| 8,363,288 B2* | 1/2013 | Yang | .................. H04N 1/00909 358/474 |
| 2002/0109868 A1* | 8/2002 | Yokota | ................. H04N 1/1017 358/497 |

FOREIGN PATENT DOCUMENTS

JP 2012-151569 8/2012

* cited by examiner

*Primary Examiner* — Houshang Safaipour
(74) *Attorney, Agent, or Firm* — Wenderoth, Lind & Ponack, L.L.P.

(57) ABSTRACT

An image reading device includes a first contact glass on which a document is conveyed from a document conveying part, a second contact glass on which the document is placed, a document separation member provided between the first contact glass and the second contact glass and separating the document from the first contact glass, a reading unit provided on rear-surface sides of the first contact glass and the second contact glass so as to be movable in a sub-scanning direction, and a guide member provided across both of the first contact glass and the document separation member on the rear-surface side of the first contact glass and guiding the movement of the reading unit.

7 Claims, 8 Drawing Sheets

IMAGE READING DEVICE AND IMAGE FORMING APPARATUS

CROSS-REFERENCE TO RELATED APPLICATION

This application is based upon and claims the benefit of priority from Japanese Patent Application No. 2013-248685 filed on Nov. 29, 2013, the entire contents of which are incorporated herein by reference.

BACKGROUND

The technology of the present disclosure relates to an image reading device and an image forming apparatus, and more particularly, to an image reading device which has a document fixed reading mode and a document conveying reading mode as a document reading mode, and an image forming apparatus.

A document reading mode is classified into two modes of a document fixed reading mode and a document conveying reading mode. In the document fixed reading mode, a document placed on a contact glass is fixed by a platen mat and the like and a reading unit is moved in a sub-scanning direction, so that the document is read. In the document conveying reading mode, a reading unit is fixed at a prescribed position and the document is read while conveying the document on the reading unit. In an image reading device having both the document fixed reading mode and the document conveying reading mode, a contact glass is classified into two glasses of a contact glass for document fixed reading and a contact glass for document conveying reading, and a document separation member for separating a read document from the contact glasses and discharging the read document is provided between the glasses.

In general, for the reading unit, a CIS (Contact Image sensor) type reading sensor extending in a main scanning direction is used. Since the CIS type reading sensor has a very shallow depth of field, the CIS type reading sensor makes close contact with the contact glass via a sliding member such as a slider. In a position at which the sliding member makes contact with the document separation member between the glasses, since the posture of the CIS type reading sensor is not stable, good document reading is not possible. Therefore, at the time of document conveying reading or reading of a white reference member, it is necessary to prevent the sliding member from making contact with the document separation member, and there is a problem that an image reading device increases in size. In order to overcome such a problem, there has been proposed an image reading device having a configuration in which the document separation member does not protrude toward the rear surface of the contact glass. According to the image reading device, since the movement of a reading unit is not disturbed by the document separation member, the image reading device can be made in a small size.

SUMMARY

An image reading device according to one aspect of the present disclosure includes a document conveying part, a first contact glass, a second contact glass, a document separation member, a reading unit, and a guide member. On the first contact glass, a document is conveyed from the document conveying part. The second contact glass is provided separately from the first contact glass. On the second contact glass, the document is placed. The document separation member is provided between the first contact glass and the second contact glass. The document separation member separates the document, which has been conveyed to the first contact glass from the document conveying part, from the first contact glass. The reading unit is provided on the rear-surface sides of the first contact glass and the second contact glass so as to be movable in a sub-scanning direction, and reads the document conveyed on the first contact glass and the document placed on the second contact glass. The guide member is provided across both of the first contact glass and the document separation member on the rear-surface side of the first contact glass, and guides the movement of the reading unit.

An image forming apparatus according to another aspect of the present disclosure is an image forming apparatus provided with the image reading device.

DETAILED DESCRIPTION

Figure 1:
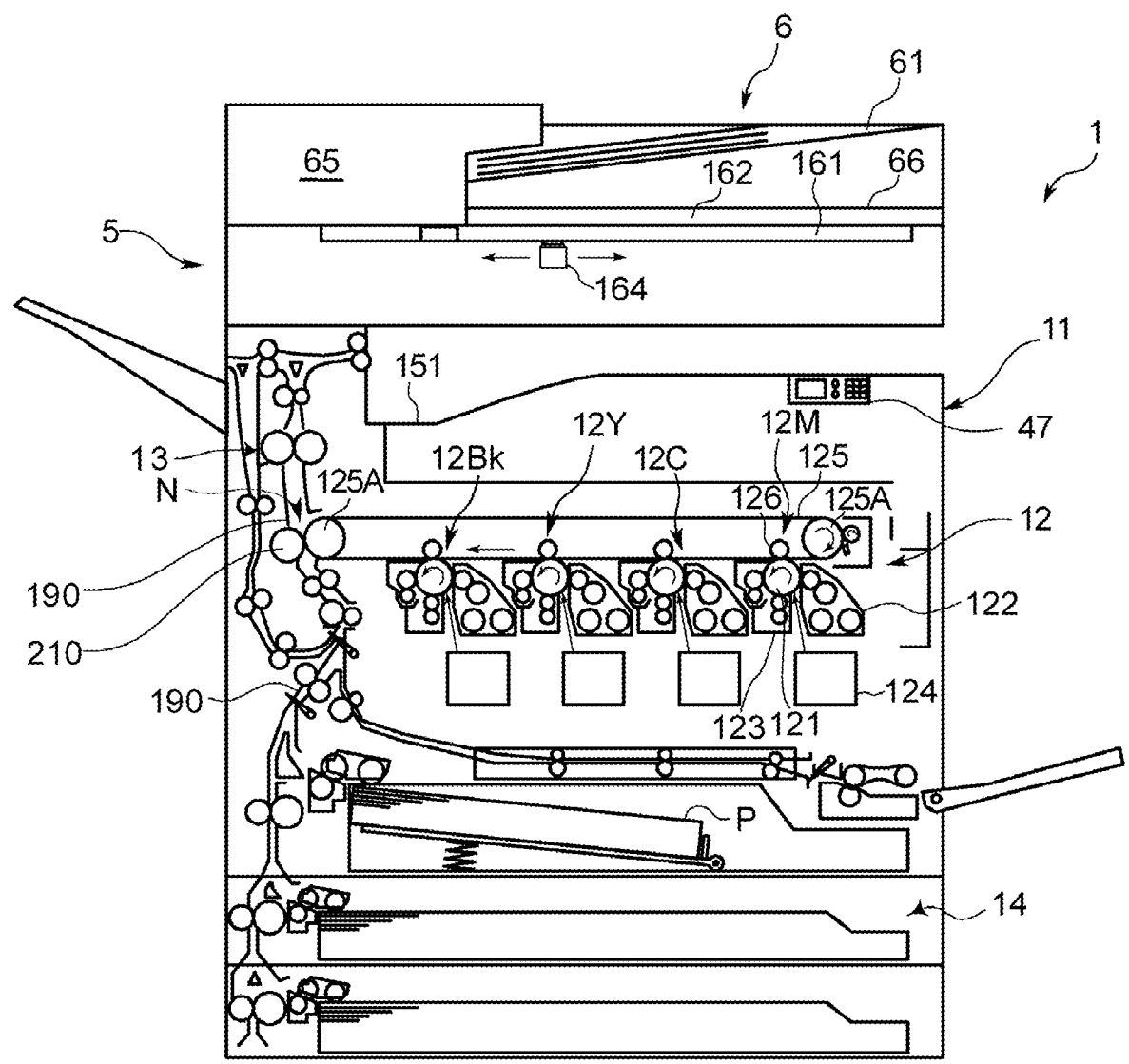
FIG. 1 is a sectional view showing the structure of an image forming apparatus according to an embodiment of the present disclosure.

An image reading device and an image forming apparatus according to an embodiment of the present disclosure will now be described in detail with reference to the accompanying drawings. FIG. 1 is a sectional view showing the structure of an image forming apparatus 1 according to an embodiment of the present disclosure.

The image forming apparatus 1 according to an embodiment of the present disclosure, for example, is a multifunctional peripheral having a plurality of functions including a copy function, a printer function, a scanner function, a facsimile function and the like. The image forming apparatus 1 is provided an apparatus body 11 thereof with an image forming part 12, a fixing part 13, a sheet feeding part 14, an operating part 47, a document conveying part 6, an image reading device 5 and the like.

The operating part 47 receives instructions such as an image forming operation execution instruction or an image reading operation execution instruction from a user with respect to various operations and processes which are executable by the image forming apparatus 1.

When the image forming apparatus 1 performs an image reading operation, the image reading device 5 optically reads a document conveyed by the document conveying part 6 or an image of a document placed on a contact glass 161, and generates image data. The image data generated by the image reading device 5 is stored in an embedded HDD, a network-connected computer, and the like.

When the image forming apparatus 1 performs an image forming operation, the image forming part 12 forms a toner image on a recording paper P as a recoding medium fed from the sheet feeding part 14 on the basis of image data generated by the image reading operation, image data received from the network-connected computer, image data stored in the embedded HDD, and the like. Each of image forming units 12M, 12C, 12Y, and 12Bk of the image forming part 12 includes a photosensitive drum 121, a developing device 122, a toner cartridge (not shown) accommodating toner, a charging device 123, an exposure device 124, and a primary transfer roller 126.

In the case of performing color printing, the image forming unit 12M for magenta, the image forming unit 12C for cyan, the image forming unit 12Y for yellow, and the image forming unit 12Bk for black of the image forming part 12 perform charging, exposure, and development processes on the basis of the image data to form toner images of respective color components on the photosensitive drum 121, and allow the formed toner images to be transferred on an intermediate transfer belt 125, which is hung on a driving roller 125A and a driven roller 125B, by the primary transfer roller 126.

The toner images of each color transferred on the intermediate transfer belt 125 overlap with one another on the intermediate transfer belt 125 at predetermined transfer timings and become a color toner image. A secondary transfer roller 210 allows the color toner image formed on the surface of the intermediate transfer belt 125 to be transferred on the recording paper P in a nip portion N formed between the secondary transfer roller 210 and the driving roller 125A while interposing the intermediate transfer belt 125 therebetween. The recording paper P is conveyed along a conveyance path 190 from the sheet feeding part 14. In this way, after the toner image is transferred on the recording paper P, the fixing part 13 allows the toner image on the recording paper P to be fixed on the recording paper P by thermal compression. The recording paper P on which the fixing process is completed and having a color image formed thereon is discharged to a discharge tray 151.

Figure 2:
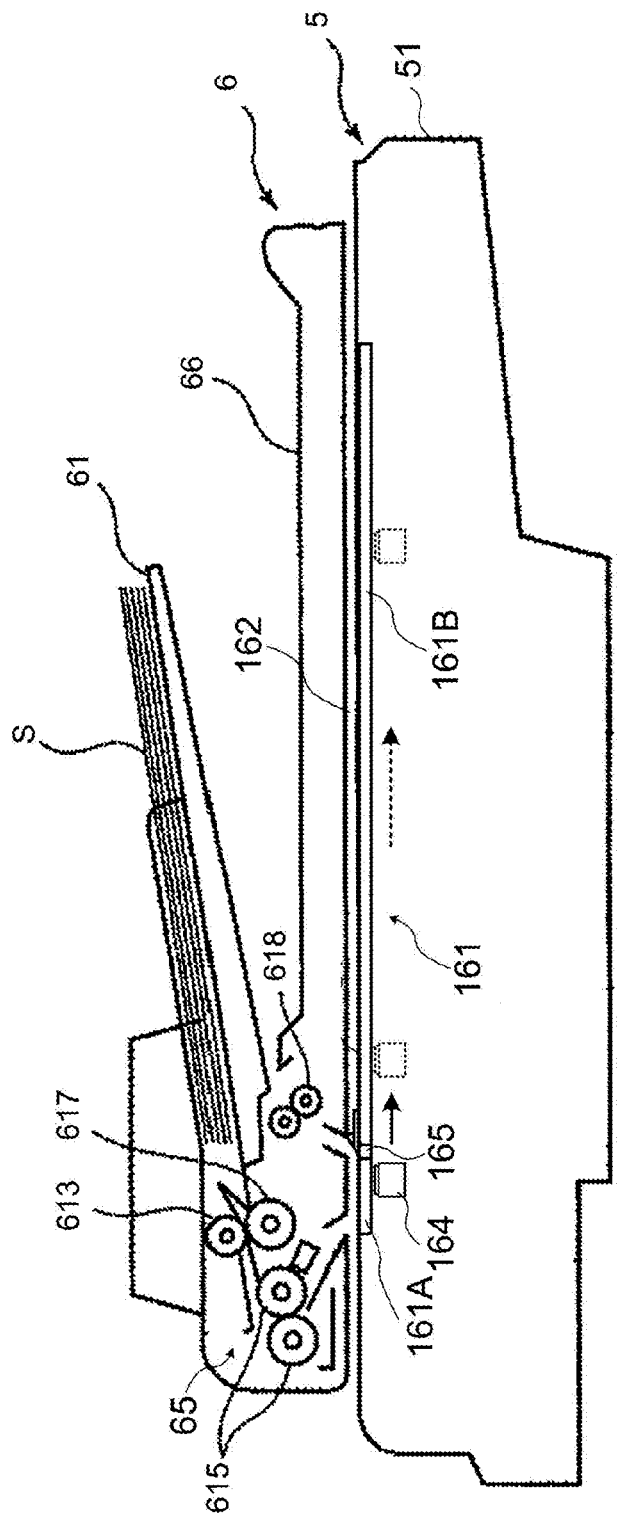
FIG. 2 is a sectional view showing the structure of an image reading device and a document conveying part according to an embodiment of the present disclosure.
Figure 3:
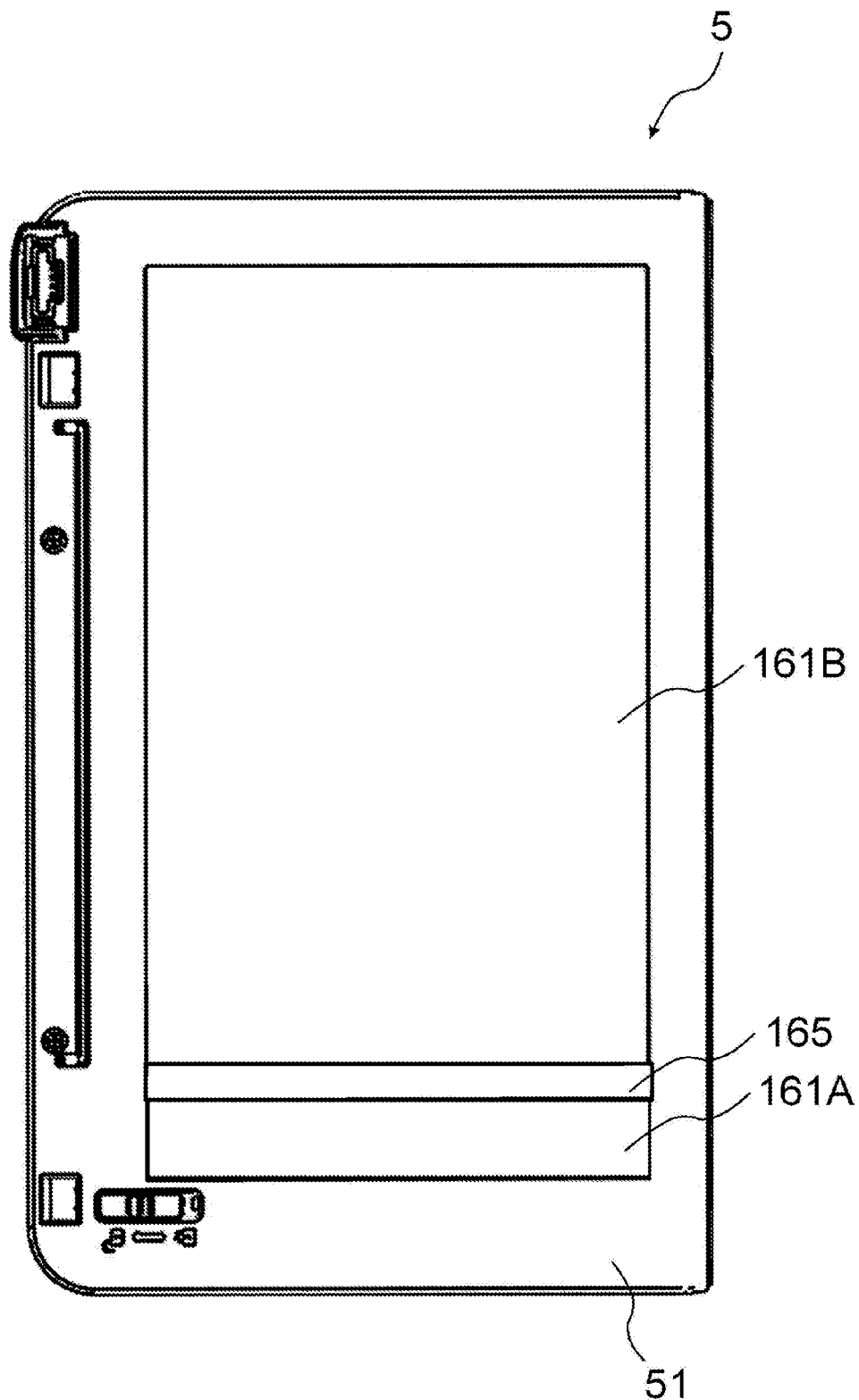
FIG. 3 is a top view showing the image reading device according to an embodiment of the present disclosure.

FIG. 2 is a sectional view showing the structure of an image reading device 5 and a document conveying part 6 according to an embodiment of the present disclosure. FIG. 3 is a top view showing the image reading device 5 according to an embodiment of the present disclosure.

The document conveying part 6 includes a document platen 61 on which a document is placed, a document discharge unit 66 for discharging a document from which an image has been read, and a document conveying mechanism 65. The document conveying mechanism 65 includes a sheet feeding roller 613, a conveying roller 615, a separation roller 617, and a sheet discharge roller 618. The document conveying mechanism 65 feeds a plurality of documents S, which are placed on the document platen 61, one by one by the sheet feeding roller 613 and the separation roller 617 arranged as a pair, and conveys the fed documents toward a first contact glass 161A, which will be described later, by the conveying roller 615. The documents conveyed on the first contact glass 161 are read by a reading unit 164 which will be described later. The document conveying mechanism 65 discharges a document, from which an image has been read, to the document discharge unit 66.

The image reading device 5 has a document conveying reading mode and a document fixed reading mode as a document reading mode. As shown in FIG. 3, on an upper opening of a housing 51 of the image reading device 5, the contact glass 161 including the first contact glass 161A and a second contact glass 161B is mounted. The first contact glass 161A is a contact glass for document conveying reading on which the documents are conveyed from the document conveying part 6. The second contact glass 161B is a contact glass for document fixed reading on which the documents are placed. A freely openable/closable document pressing member 162 is provided above the second contact glass 161B, and the documents placed on the second contact glass 161B are fixed by the document pressing member 162.

The reading unit 164 provided so as to be movable in a sub-scanning direction is provided at the surface (the rear surface) opposite to the surface (the front surface) on which the documents of the contact glass 161 are placed. The reading unit 164 has a CIS (Contact Image sensor) type reading sensor extending in a main scanning direction therein. Since the CIS (Contact Image sensor) type reading sensor has a very shallow depth of field, the reading unit 164 makes close contact with the contact glass 161 via a slider 167 (see FIG. 5A and FIG. 5B).

In the document fixed reading, the reading unit 164 reciprocates in the sub-scanning direction and reads the documents placed on the second contact glass 161B. On the other hand, in the document conveying reading, the reading unit 164 is fixed at a prescribed position on the rear surface of the first contact glass 161A, and the documents conveyed toward the first contact glass 161A by the document conveying part 6 are read.

The reading unit 164, for example, projects LED (Light Emitting Diode) light of three colors of red, green, and blue on a document to be read while switching the light, and receives reflected light from the document by a CMOS (Complementary Metal Oxide Semiconductor) image sensor. The CMOS image sensor converts the incident light into an electrical signal and acquires image data corresponding to one line in the main scanning direction. The image data is converted into a digital signal by an A/D converter embedded in the image forming apparatus 1, and then is further subjected to various image processes of shading correction, gamma correction, chromatic aberration correction, MTF (Modulation Transfer Function) correction, scanner color correction and the like. The image data generated by the image processes is stored in an image memory or a HDD embedded in the image forming apparatus 1.

Figure 4:
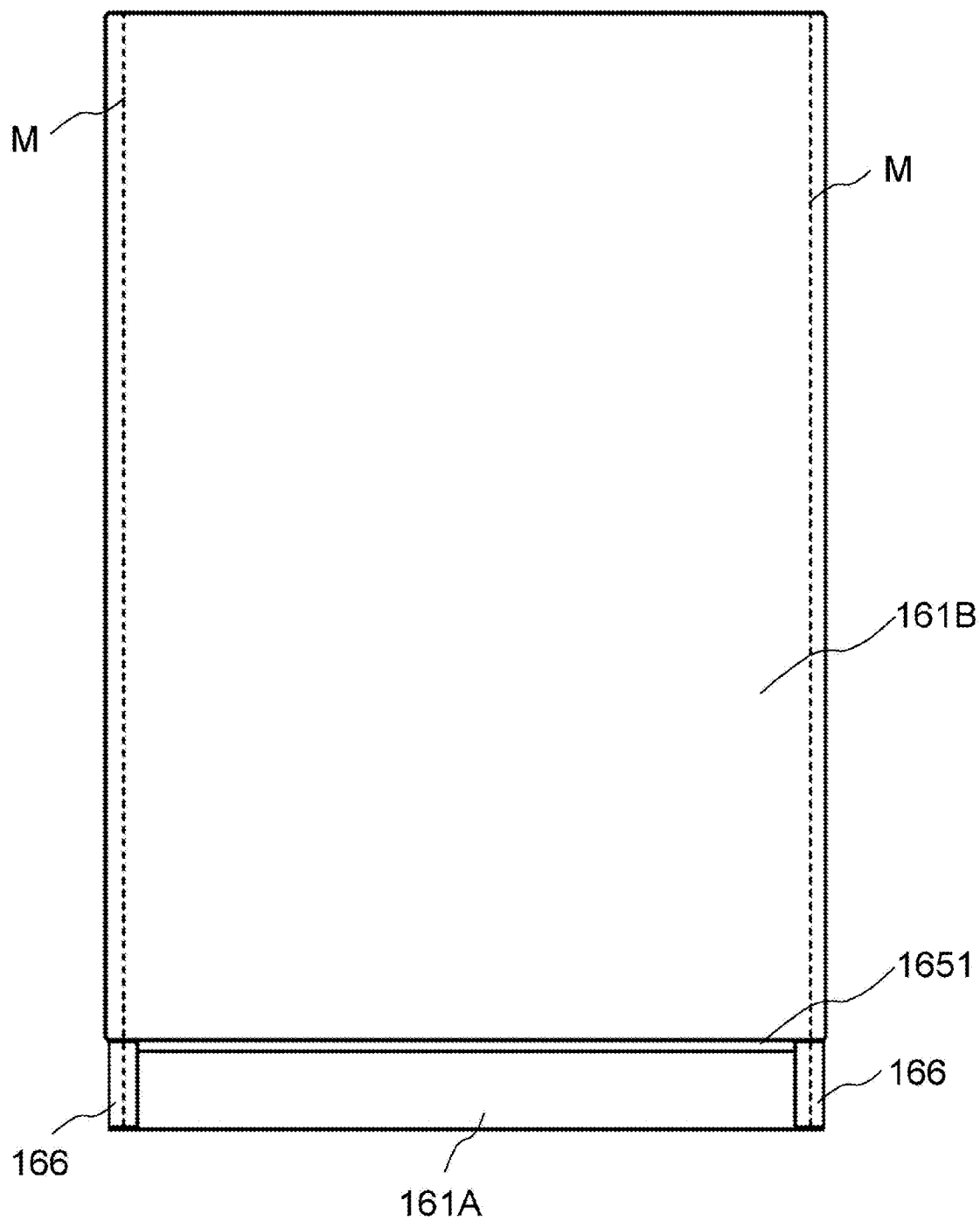
FIG. 4 is a bottom view showing a contact glass according to an embodiment of the present disclosure.
Figure 5A:
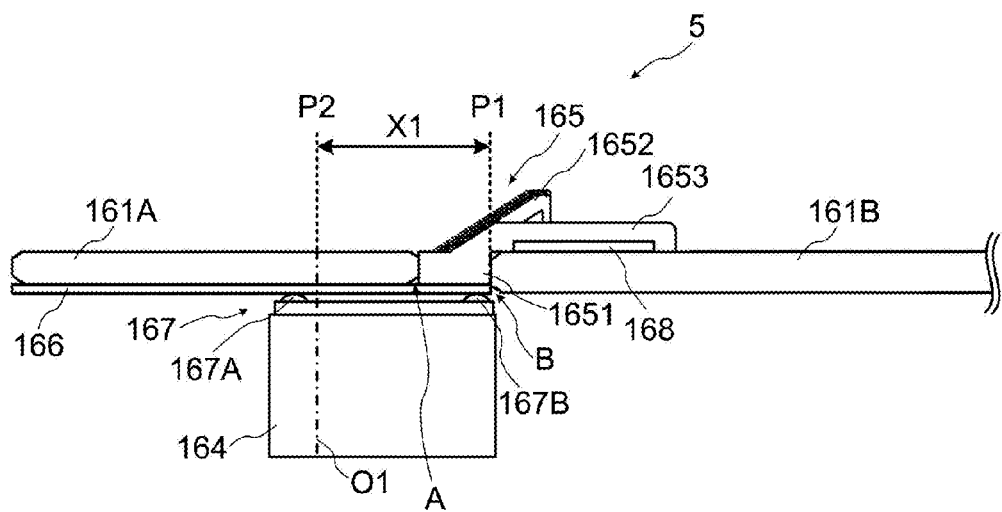
FIG. 5A is a side view showing the surrounding of a reading unit at the time of document fixed reading.
Figure 5B:
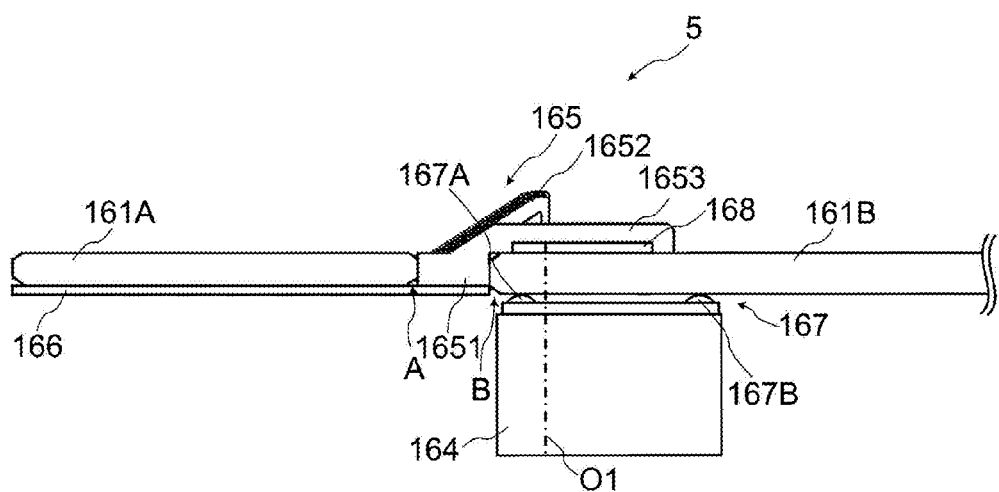
FIG. 5B is a side view showing the surrounding of the reading unit at the time of reading of a white reference member.

Subsequently, the configuration around the contact glass 161 of the image reading device 5 will be further described. FIG. 4 is a bottom view showing the contact glass 161 according to an embodiment of the present disclosure. FIG. 5A is a side view showing the surrounding of the reading unit 164 at the time of document fixed reading, and FIG. 5B is a side view showing the surrounding of the reading unit 164 at the time of reading of a white reference member 168.

A document separation member 165 is provided between the first contact glass 161A and the second contact glass 161B. The document separation member 165 is provided with a slant portion 1652 protruding from a base 1651, and the documents conveyed from the document conveying part 6 to the first contact glass 161A are separated from the first contact glass 161A by the slant portion 1652. The document separation member 165 is provided with a fixing member 1653 for fixing the white reference member 168 for shading correction at a prescribed position on the second contact glass 161B.

A guide member 166 for guiding the movement of the reading unit 164 is provided at each of opposite end portions of the rear surface of the base 1651 of the document separation member 165 and the rear surface of the first contact glass 161A in the main scanning direction across both of the first contact glass 161A and the document separation member 165. The guide member 166 is made of a member of steel and the like which has stiffness that prevents the guide member 166 from being deformed by the movement of the reading unit 164 in contact with the guide member 166. Thus, the reading unit 164 can be moved with a stable posture for a long period of time, so that good document reading is possible.

The slider 167 (a sliding member) is provided at opposite end portions of the surface of the reading unit 164 in the main scanning direction, the surface facing the contact glass 161. The slider 167 is provided with a first protrusion 167A and a second protrusion 167B. The dotted line M of FIG. 4 indicates a contact position of the slider 167. In the document fixed reading, in the state in which the first protrusion 167A and the second protrusion 167B of the slider 167 make contact with opposite end portions of the rear surface of the second contact glass 161B in the main scanning direction, the reading unit 164 reciprocates in the sub-scanning direction. At the time of the reading of the white reference member 168, in the state in which the first protrusion 167A and the second protrusion 167B of the slider 167 make contact with the opposite end portions of the rear surface of the second contact glass 161B in the main scanning direction, the reading unit 164 moves to the prescribed position on the second contact glass 161B. Even if contamination or dust is attached to the white reference member 168, in order to acquire an appropriate white reference, the reading unit 164 reciprocates from the prescribed position and reads the white reference member 168 by a prescribed length.

On the other hand, at the time of the document conveying reading, the reading unit 164 is fixed at a prescribed position. At this time, the reading optical axis O1 of the reading unit 164 passes through the reading position (the document conveying reading position) of a document in the document conveying reading. Since the first contact glass 161A and the document separation member 165 are formed of separate members, a stepped portion A exists between the first contact glass 161A and the document separation member 165. Similarly, a stepped portion B exists between the second contact glass 161B and the document separation member 165. In a conventional image reading device not provided with the guide member 166 across both of the first contact glass 161A and the document separation member 165, at the time of the document conveying reading, when the first protrusion 167A and the second protrusion 167B of the slider 167 make contact with the stepped portion A, since the posture of the CIS type reading sensor is not stable, good document reading is not possible. In this regard, in the image reading device 5 and the image forming apparatus 1 according to an embodiment of the present disclosure, since the guide member 166 is provided across both of the first contact glass 161A and the document separation member 165, the first protrusion 167A and the second protrusion 167B of the slider 167 do not make contact with the stepped portion A at the time of the document conveying reading.

As shown in FIG. 5A and FIG. 5B, the thickness of the first contact glass 161A, the thickness of the second contact glass 161B, and the thickness of the guide member 166 are set such that the surface included in the guide member 166 and with which the reading unit 164 contacts and the surface included in the second contact glass 161B and with which the reading unit 164 contacts are positioned on approximately the same plane. As set forth above, the thicknesses of the respective members are set, so that it is possible to reduce the size of the stepped portion B, and when the reading unit 164 moves, the posture of the reading unit 164 is difficult to be unstable. Moreover, when the reading unit 164 passes through the stepped portion B, it is possible to reduce the abrasion of the slider 167.

Moreover, the thickness of the first contact glass 161A is designed to be smaller than the thickness of the second contact glass 161B. Thus, even in the configuration of the image reading device 5 according to the present embodiment in which the guide member 166 is provided between the document and the reading unit 164, when the focal position of the CIS type reading sensor is deviated, it is possible to reduce the influence caused by the deterioration of the focus performance of the reading sensor.

Figure 6:
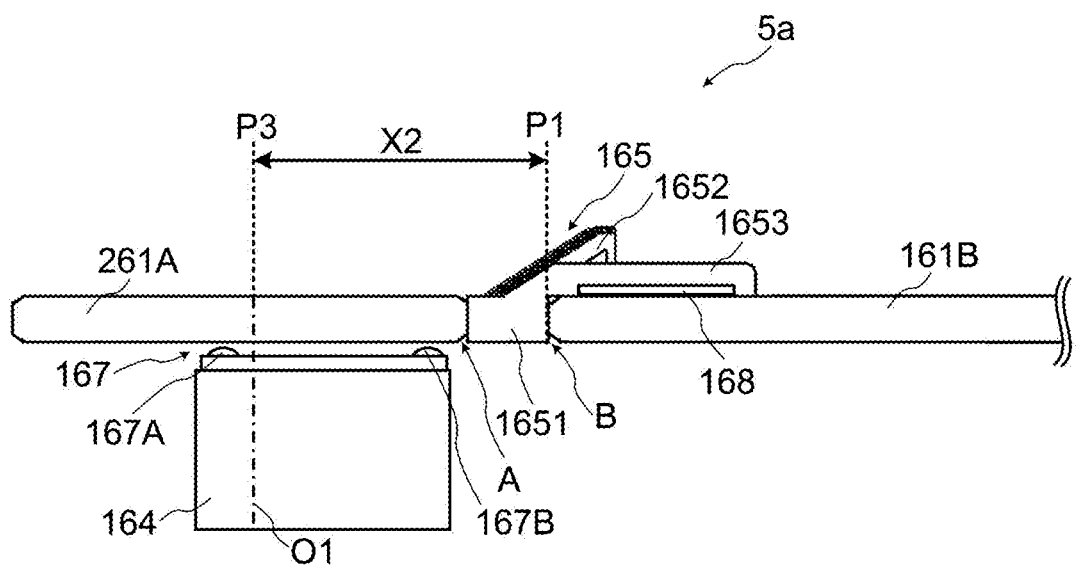
FIG. 6 is a side view showing the surrounding of the reading unit at the time of document fixed reading in an image reading device according to a comparison example.

FIG. 6 is a side view showing the surrounding of the reading unit 164 at the time of document fixed reading in an image reading device 5a according to a comparison example. The image reading device 5a according to the comparison example is different in that the guide member 166 is not provided, and the thickness of a first contact glass 261A is larger than the thickness of the first contact glass 161A of the image reading device 5 according to the present embodiment and is approximately equal to the thickness of the second contact glass 161B.

As shown in FIG. 5A, in the image reading device 5 according to the present embodiment, the second protrusion 167B of the slider 167 can be approximated to a boundary position P1 between the document separation member 165 and the second contact glass 161B, so that the reading unit 164 can be moved with a stable reading posture. Thus, the reading position P2 (the document conveying reading position) of a document in the document conveying reading can be provided near the boundary position P1. Thus, the size of the first contact glass 161A can be reduced, so that the image reading device 5 can be made in a small size.

On the other hand, as shown in FIG. 6, in the image reading device 5a according to the comparison example, the second protrusion 167B of the slider 167 can be approximated only to a boundary position between the first contact glass 261A and the document separation member 165. Thus, the document conveying reading position P3 cannot be provided near the boundary position P1. Therefore, the size of the first contact glass 261A increases, so that the image reading device 5 increases in size.

The document conveying reading position P2 of the image reading device 5 according to the present embodiment can be approximated to the boundary position P1 side by the length of the base 1651 of the document separation member 165, as compared with the document conveying reading position P3 of the image reading device 5a according to the comparison example.

In the example shown in FIG. 5A and FIG. 5B, there has been described the case in which the reading optical axis O1 of the reading unit 164 is provided at the end portion of the first contact glass 161A side. However, depending on the structure of the CIS type reading sensor embedded in the reading unit 164, the reading optical axis O1 of the reading unit 164 may be provided at the center portion of the reading unit 164 or the end portion of the second contact glass 161B side. In this case, when employing the configuration in which the guide member 166 across both of the first contact glass 161A and the document separation member 165 is not provided, since it is difficult to read the white reference member 168 for shading correction at a stable posture, it is necessary to increase the size of the white reference member 168 for the purpose of reading at a stable posture. Hereinafter, a description will be provided for the case in which the reading optical axis O1 of the reading unit 164 is provided at the end portion of the second contact glass 161B side.

Figure 7A:
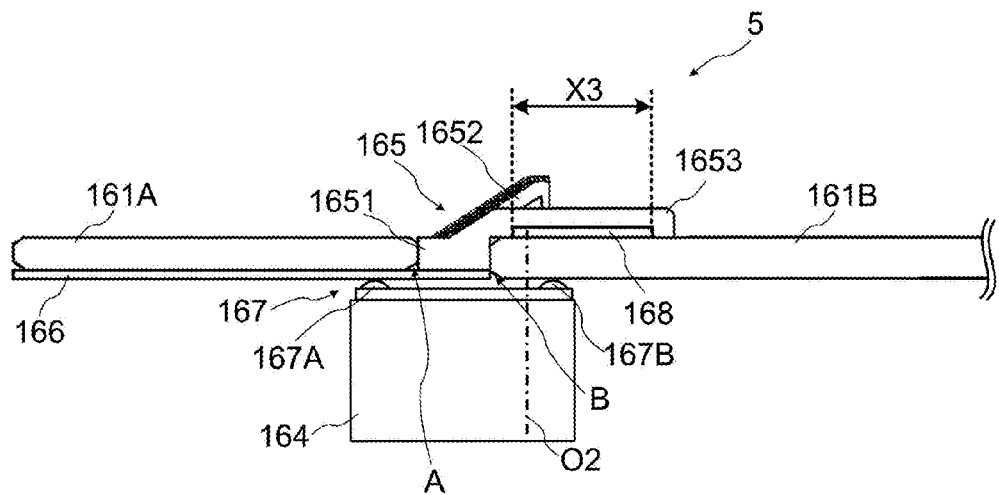
FIG. 7A is a side view showing the case in which the reading unit is positioned at the left end in the readable range of the white reference member in a configuration in which the reading unit is provided at the end portion of a second contact glass side.
Figure 7B:
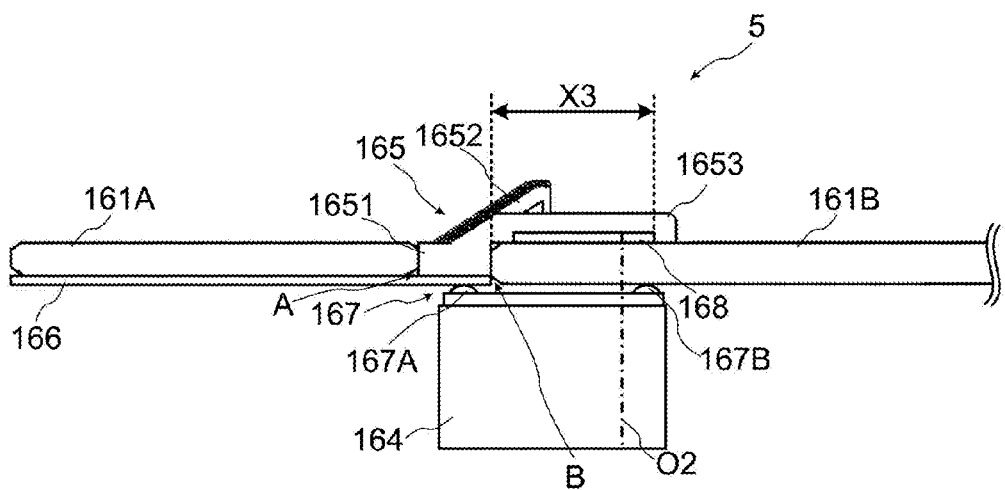
FIG. 7B is a side view showing the case in which the reading unit is positioned at the right end in the readable range of the white reference member.

FIG. 7A is a side view showing the case in which the reading unit 164 is positioned at the left end in the readable range of the white reference member 168 in the configuration in which the reading unit 164 is provided at the end portion of the second contact glass 161B side. FIG. 7B is a side view showing the case in which the reading unit 164 is positioned at the right end in the readable range of the white reference member 168.

As described above, even if contamination or dust is attached to the white reference member 168, in order to acquire an appropriate white reference, the reading unit 164 needs to reciprocate at the time of reading of the white reference member 168 and read the white reference member 168 by a prescribed length. As shown in FIG. 7A and FIG. 7B, in the image reading device 5 according to the present embodiment, the first protrusion 167A of the slider 167 is allowed to make contact with the guide member 166, the second protrusion 167B of the slider 167 is allowed to make contact with the second contact glass 161B, and the reading unit 164 is allowed to move, so that it is possible to read the white reference member 168 by a prescribed length. Thus, it is possible to provide the left end and the right end in the readable range of the white reference member 168 at a position near the boundary position P1 between the document separation member 165 and the second contact glass 161B. Thus, in the image reading device 5 according to the present embodiment, even if the reading unit 164 is provided at the end portion of the second contact glass 161B side, since the length X3 of the white reference member 168 is difficult to increase, the image reading device 5 can be made in a small size.

Figure 8A:
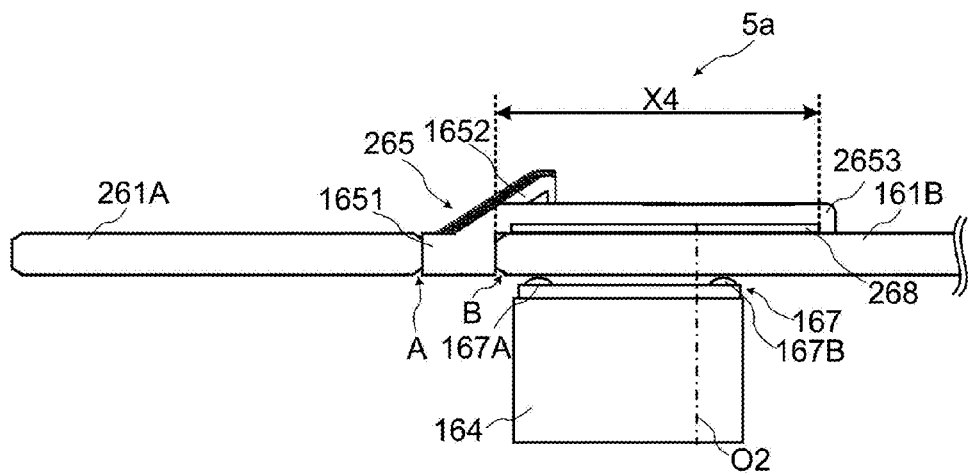
FIG. 8A is a side view showing the case in which the reading unit is positioned at the left end in the readable range of the white reference member in a configuration in which the reading unit is provided at the end portion of the second contact glass side in the image reading device according to the comparison example.
Figure 8B:
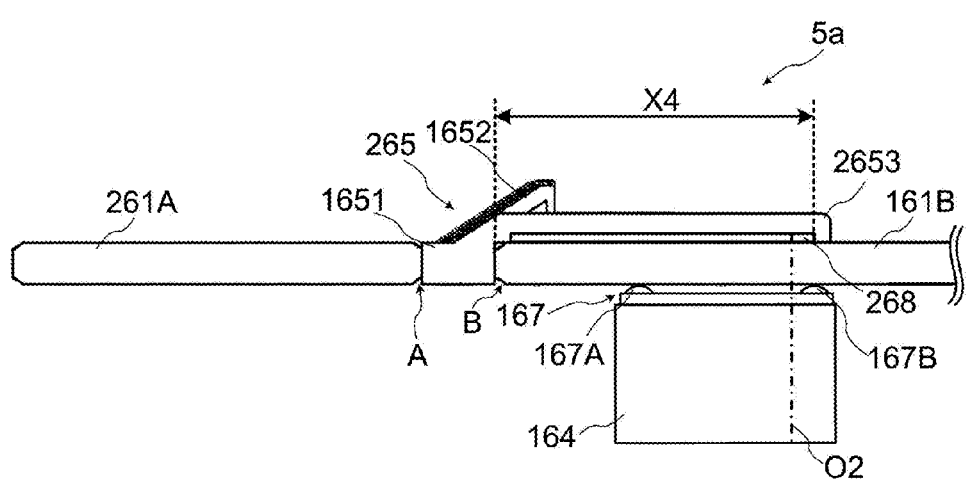
FIG. 8B is a side view showing the case in which the reading unit is positioned at the right end in the readable range of the white reference member.

FIG. 8A is a side view showing the case in which the reading unit 164 is positioned at the left end in a readable range of a white reference member 268 in the configuration in which the reading unit 164 is provided at the end portion of the second contact glass 161B side in the image reading device 5*a* according to the comparison example. FIG. 8B is a side view showing the case in which the reading unit 164 is positioned at the right end in the readable range of the white reference member 268.

In the image reading device 5*a* according to the comparison example, it is necessary to read the white reference member 268 by a prescribed length by allowing the first protrusion 167A and the second protrusion 167B of the slider 167 to make contact with the second contact glass 161B, and moving the reading unit 164. In this case, since it is not possible to move the first protrusion 167A of the slider 167 to the left side from the boundary position P1 between the document separation member 165 and the second contact glass 161B, the left end and the right end in the readable range of the white reference member 268 are provided at a position remote from the boundary position P1 as shown in FIG. 8A and FIG. 8B. Thus, in the image reading device 5*a* according to the comparison example, when the reading unit 164 is provided at the end portion of the second contact glass 161B side, the length X4 of the white reference member 268 increases. Moreover, as the length X4 of the white reference member 268 increases, the size of a fixing member 2653 of a document separation member 265 increases. Thus, the image reading device 5*a* increases in size.

As described above, in the image reading device 5 according to the aforementioned embodiment, the guide member 166 is provided across both of the first contact glass 161A and the document separation member 165 on the rear-surface side of the first contact glass 161A, and guides the movement of the reading unit 164.

According to the aforementioned configuration, good document reading is possible and the image reading device 5 can be made in a small size.

What is claimed is:

1. An image reading device comprising:
a document conveying part;
a first contact glass on which a document is conveyed from the document conveying part;
a second contact glass provided separately from the first contact glass and on which the document is placed;
a document separation member provided between the first contact glass and the second contact glass, and separating the document, which has been conveyed to the first contact glass from the document conveying part, from the first contact glass, a rear surface of the document separation member and a rear surface of the first contact glass being positioned on approximately the same plane;
a reading unit provided on rear-surface sides of the first contact glass and the second contact glass so as to be movable in a sub-scanning direction, the reading unit being able to read the document conveyed on the first contact glass and the document placed on the second contact glass; and
a guide member provided across both of the rear surface of the first contact glass and the rear surface of the document separation member so as to make contact with both of the rear surfaces of the first contact glass and the document separation member, the guide member guiding movement of the reading unit.

2. The image reading device of claim 1, wherein the guide member is provided at each of opposite end portions of the first contact glass and the document separation member in a main scanning direction, a sliding member is provided at opposite end portions of a surface of the reading unit in the main scanning direction, the surface facing the first contact glass, and the reading unit makes contact with the guide member via the sliding member.

3. The image reading device of claim 1, wherein a surface included in the guide member and with which the reading unit contacts and a surface included in the second contact glass and with which the reading unit contacts are positioned on approximately the same plane.

4. The image reading device of claim 1, wherein a thickness of the first contact glass is smaller than a thickness of the second contact glass.

5. The image reading device of claim 1, wherein the guide member has stiffness that prevents the guide member from being deformed by movement of the reading unit in contact with the guide member.

6. The image reading device of claim 1, wherein the reading unit includes a contact image sensor.

7. An image forming apparatus including the image reading device of claim 1.

\* \* \* \* \*